(12) United States Patent
Harper

(10) Patent No.: US 8,638,523 B2
(45) Date of Patent: Jan. 28, 2014

(54) ENABLING PARTIAL WRITE DURING A TAPE SKEW

(75) Inventor: David H. Harper, Vail, AZ (US)

(73) Assignee: International Business Machines Corporation, Armonk, NY (US)

(*) Notice: Subject to any disclaimer, the term of this patent is extended or adjusted under 35 U.S.C. 154(b) by 18 days.

(21) Appl. No.: 13/540,428

(22) Filed: Jul. 2, 2012

(65) Prior Publication Data

US 2014/0002916 A1    Jan. 2, 2014

(51) Int. Cl.
*G11B 5/584* (2006.01)
*G11B 20/20* (2006.01)
*G11B 5/09* (2006.01)

(52) U.S. Cl.
USPC .............................. 360/77.12; 360/76; 360/53

(58) Field of Classification Search
None
See application file for complete search history.

(56) References Cited

U.S. PATENT DOCUMENTS

| | | | | |
|---|---|---|---|---|
| 3,790,954 | A * | 2/1974 | Devore et al. | 714/700 |
| 5,982,711 | A * | 11/1999 | Knowles et al. | 360/77.12 |
| 6,430,008 | B1 * | 8/2002 | Trabert et al. | 360/317 |
| 7,307,809 | B2 | 12/2007 | Neumann | |
| 2004/0257694 | A1 * | 12/2004 | Knowles et al. | 360/77.12 |
| 2010/0067139 | A1 | 3/2010 | Bates et al. | |

FOREIGN PATENT DOCUMENTS

WO    2011077340 A1    6/2011

OTHER PUBLICATIONS

Donnelly et al., "Real-time Microprocessor Monitoring of Skew Angle in a Compact Cassette Multitrack Magnetic Tape System" Journal of the Institution of Electronic and Radio Engineers, vol. 56, No. 2, pp. 49-52, Feb. 1986 [online], [retrieved on Jun. 26, 2012]. Retrieved from the Internet <URL: http://ieeexplore.ieee.org/stamp/stamp.jsp?tp=&arnumber=5261353>.

* cited by examiner

*Primary Examiner* — Andrew L Sniezek
(74) *Attorney, Agent, or Firm* — Jason H. Sosa

(57) ABSTRACT

A system provides tape having at least one longitudinal data track and a tape head operative to move along a single axis line lateral to the data track. The storage tape moves across the tape head. The tape head moves along the axis line such that a write element of the tape head intersects the data track and writes data to a section of the data track. A controller determines that the storage tape is skewed. In response to determining that the storage tape is skewed, the controller determines a position along the axis line and a time to move the tape head such that the read elements intersects the section of the data track. At the determined time, the tape head pauses writing of data and moves to the position along the axis line. The tape head reads the section of the data track to verify the written data.

12 Claims, 5 Drawing Sheets

ENABLING PARTIAL WRITE DURING A TAPE SKEW

FIELD OF THE INVENTION

The present invention relates generally to the field of tape drive storage and more particularly to writing data to tape with longitudinal tracks.

BACKGROUND OF THE INVENTION

Tape storage technology provides magnetic or optical tape for storing data. The tape typically contains a plurality of longitudinal data bands, each containing a plurality of longitudinal data tracks. A head component, also referred to as a head module or tape head, is used for writing to and reading from the tape. At the top and bottom of each data band is a servo band, made up of a plurality of patterns on the tape, providing lateral location information of the head component as it writes and verifies data tracks within that band. The head component typically has a write element and a read/verify element corresponding to each data track of a data band. Each set of write and read/verify elements are, typically, statically positioned in-line with each other such that, as the tape moves in the longitudinal direction across the head component, the data track corresponding to each respective set of write and read/verify elements, passes directly beneath (or above) each element of the set in turn. As the tape moves beneath (or above) the head component, the write element writes data onto a block on the corresponding data track. As the data passes the read/verify element, the read/verify element immediately checks for errors. If any errors are detected, the block of data is rewritten further down the tape.

Overwriting and data recovery problems can be caused by small lateral tape movements which occur due to mechanical tolerances, environmental factors, and general wear of the media and of the drive mechanism. Such small lateral movements increase the risk of overwriting neighboring tracks. In track-following technology, the tape head moves laterally across the width of the tape to compensate for any lateral tape movement. Special elements (servo read elements) on the tape head monitor the servo bands on the tape and detect whether the tape is moving laterally. The system will automatically move the tape head to compensate for the tape movement. During this lateral tape movement, the tape does not pass the tape head orthogonally, and this deviation from the orthogonal angle between the tape and the tape head is referred to as the skew. Additionally, because the tape head moves as a single unit, even as the tape head moves to compensate for lateral tape motion, the skew may prevent the read/verify element from verifying data written on a data track by the corresponding write element.

SUMMARY

The tape moves longitudinally and a servo system causes a write element of the tape head to laterally align with the longitudinal positions of the tracks and to follow those track positions as defined by the servo, to write the longitudinal tracks. The tape may move in the lateral direction and the servo moves the write head laterally to follow the tape. Skew is when the tape "tilts" and moves differently in a lateral direction at the front of the tape head (the write elements) as compared to the lateral position at the rear of the tape head. Thus, a system provides storage tape having at least one data track and a tape head operative to move laterally (relative to the data track) along a single axis line to the data track and between data tracks, the tape head having a write element for writing data to the data track and a read element for reading data from data track. The storage tape moves longitudinally across the tape head and is subject to various lateral movements. The tape head moves along the axis line to follow lateral movement of the storage tape such that the write element intersects the data track and writes data to a section of the data track. A controller determines that the storage tape is skewed such that the storage tape does not pass the axis line orthogonally. In response to determining that the storage tape is skewed, the controller determines a position along the axis line to move the tape head such that the read element will intersect the data track and determines a time to start to move the tape head to the position such that the read element will intersect the section of the data track. At the determined time, the tape head pauses writing of data and moves to the position along the axis line. The tape head reads the section of the data track to verify the written data.

DETAILED DESCRIPTION

Figure 1:
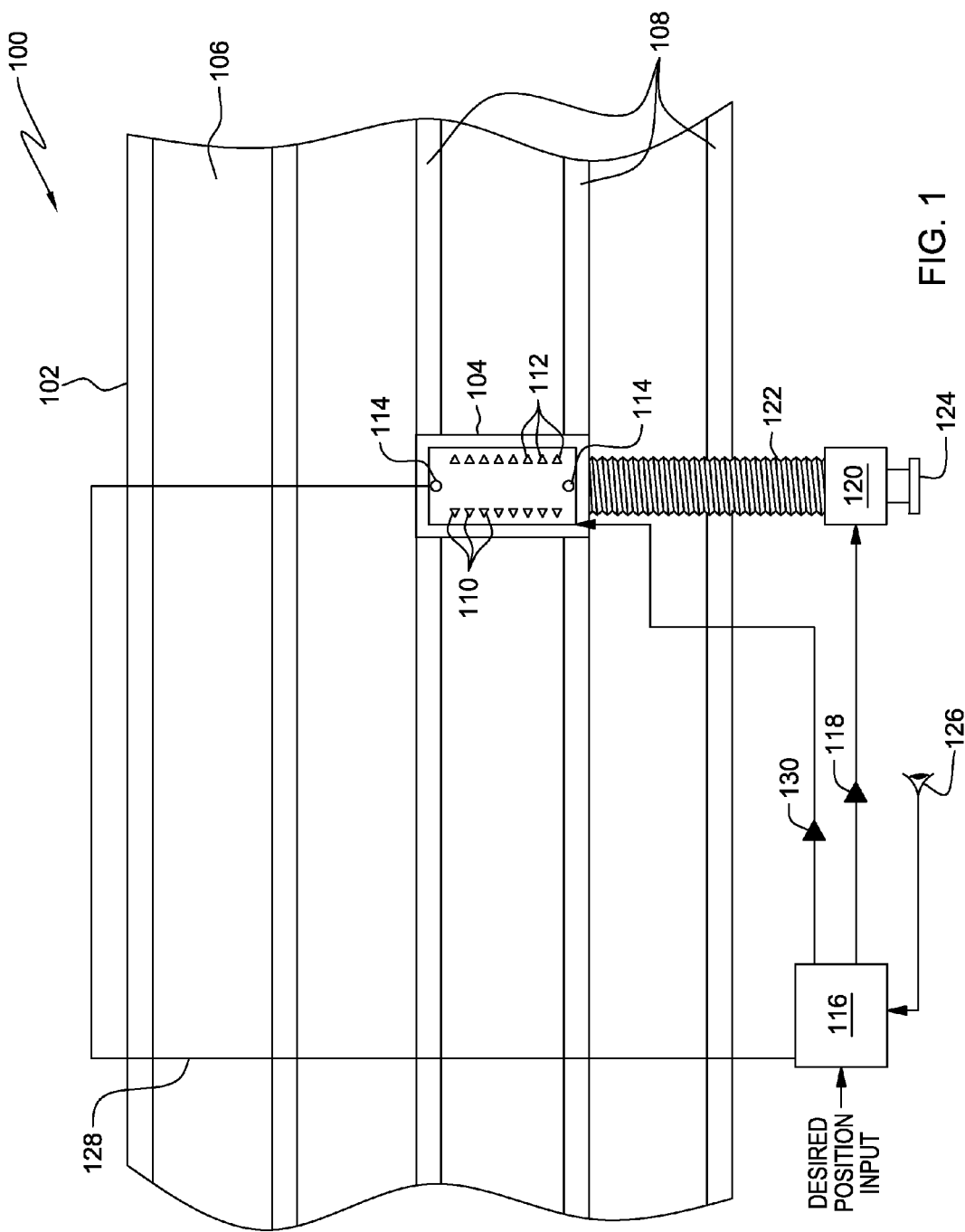
FIG. 1 depicts a system-level diagram of an exemplary system for reading from and writing to tape, in accordance with one embodiment of the present invention.

The present invention will now be described in detail with reference to the Figures. FIG. 1 depicts a system-level diagram of an exemplary system, designated 100, for reading from and writing to tape, in accordance with one embodiment of the present invention.

Within system 100, magnetic or optical tape, tape 102, is divided into four data bands (data bands 106). In another embodiment, tape 102 may be divided into any number of data bands. The head component, tape head 104, spans one full band. Tape 102 moves in a longitudinal direction across tape head 104 such that data can be written to data tracks in a data band and verified in sequence. Servo bands 108 provide lateral location information for tape head 104 as the tape head writes and verifies data tracks within that band. More particularly, from servo bands 108, lateral movement of the tape can be determined and tape head 104 can be moved in a lateral direction to follow such movement. Additionally, tape head 104 may move laterally across data tracks to another data band or set of tracks. Due to this feature, the lateral motion of tape head 104 may be referred to as "cross-track."

Tape head 104 includes a series of write elements 110 and corresponding read/verify elements 112 such that, as tape 102 moves across tape head 104, each of the write elements 110 and corresponding read/verify elements 112 align with a separate data track. As oriented in FIG. 1, write elements 110 are positioned along the left side of tape head 104 and read/verify elements 112 are positioned along the right side of tape head 104. In this manner, with tape 102 moving longitudinally from left to right, data can be written to a data track by one of write elements 110 and immediately verified by one of read/verify elements 112. A person of ordinary skill in the art will recognize that, in another embodiment, the write elements and read/verify elements can be on opposite sides of tape head 104, or in yet another embodiment, each side of tape head 104 will have both a write element and read/verify element for each corresponding data track such that tape head 104 can sequentially write and verify according to a direction tape 102 moves across tape head 104.

Tape head 104 also includes servo read elements 114 capable of reading servo patterns in servo bands 108 for positioning tape head 104. For example, in timing-based servo systems, recorded servo patterns consist of magnetic transitions with two different azimuthal slopes. Lateral tape head position is derived from the relative timing of pulses, or dibits, generated by a narrow head reading the servo patterns. In general, tape head 104 is capable of cross-track adjustment, moving up and down (as oriented in FIG. 1) across the width of tape 102. Typically, these cross-track adjustments are accomplished through either a "coarse" actuator, allowing for large tape head movements such as moving from one data band to another, or a "fine" actuator adjusting the tape head position within a data band. A person of skill in the art will recognize that a single actuator may in fact accomplish both coarse and fine movements.

System 100 may use controller 116 for gathering positional information, comparing that to a desired position, and effecting necessary coarse and fine positional changes of tape head 104 along the cross-track direction. Controller 116 may be a standard microprocessor with microcode instructions stored either inside controller 116 or in a separate EPROM (not shown). Based on the difference between the actual position of tape head 104 and the desired position of tape head 104, controller 116 supplies low-level coarse position signals to power amplifier 118. In one embodiment, power amplifier 118 amplifies coarse position signals into sufficient voltage and amperage to turn lead screw motor 120. Lead screw motor 120 turns coarse position lead screw 122, which is directly connected to tape head 104. As lead screw 122 is turned by lead screw motor 120, the elevation or position of tape head 104 along the vertical cross-tape direction is changed.

In one embodiment, system 100 also includes rotary digital tachometer 124 attached to lead screw motor 120 that is read by optical sensor 126. Thus, optical sensor 126 reads coarse position motion of lead screw 122, as turned by lead screw motor 120. Controller 116, having been programmed to know the pitch of lead screw 122, then knows the position of tape head 104 by the number of turns and fraction thereof made by lead screw 122. Thus, the coarse position is a closed loop servo system.

In an alternate embodiment, coarse positioning of tape head 104 can be accomplished through an electromagnet. More specifically, power amplifier 118 amplifies coarse position signals into sufficient voltage and amperage to activate a voice coil (or other electro-mechanical) actuator to position tape head 104 relative to tape 102. Instead of turning a lead screw, as with a mechanical linear actuator, a current can be driven through the voice coil to produce a magnetic field. The magnetic field can be manipulated to affect the linear motion of tape head 104.

System 100 also includes independent fine position control for tape head 104. As depicted, servo read elements 114, write elements 110, and read/verify elements 112 are all on a component of tape head 104 that can make minor adjustments in the cross-track direction. Controller 116 receives servo positional information from servo read elements 114, via control cable 128. This cable may, in one embodiment, also carry data I/O information. Controller 116 compares the actual position of tape head 104 relative to the target servo track and compares that to the desired position. Controller 116 uses this comparison to correct the position of tape head 104 by sending signals to power amplifier 130. Power amplifier 130 amplifies the low level signals from controller 116 into sufficient voltage and amperage to activate a more sensitive cross-track actuator. The cross-track actuator then moves tape head 104 (or the component of tape head 104) to the desired/necessary position. Thus, there is a closed loop fine position control for tape head 104.

Servo bands 108 may include longitudinal positional information along with the information for lateral servoing. This information, read by servo read elements 114, identifies the regions of the tape that write elements 110 and read/verify elements 112 are over. This information, which is factory written to the tape, could be used to complement the coarse positioning of tape head 104, or to eliminate rotary digital tachometer 124 and its optical sensor 126 from the coarse position control loop.

Figure 2:
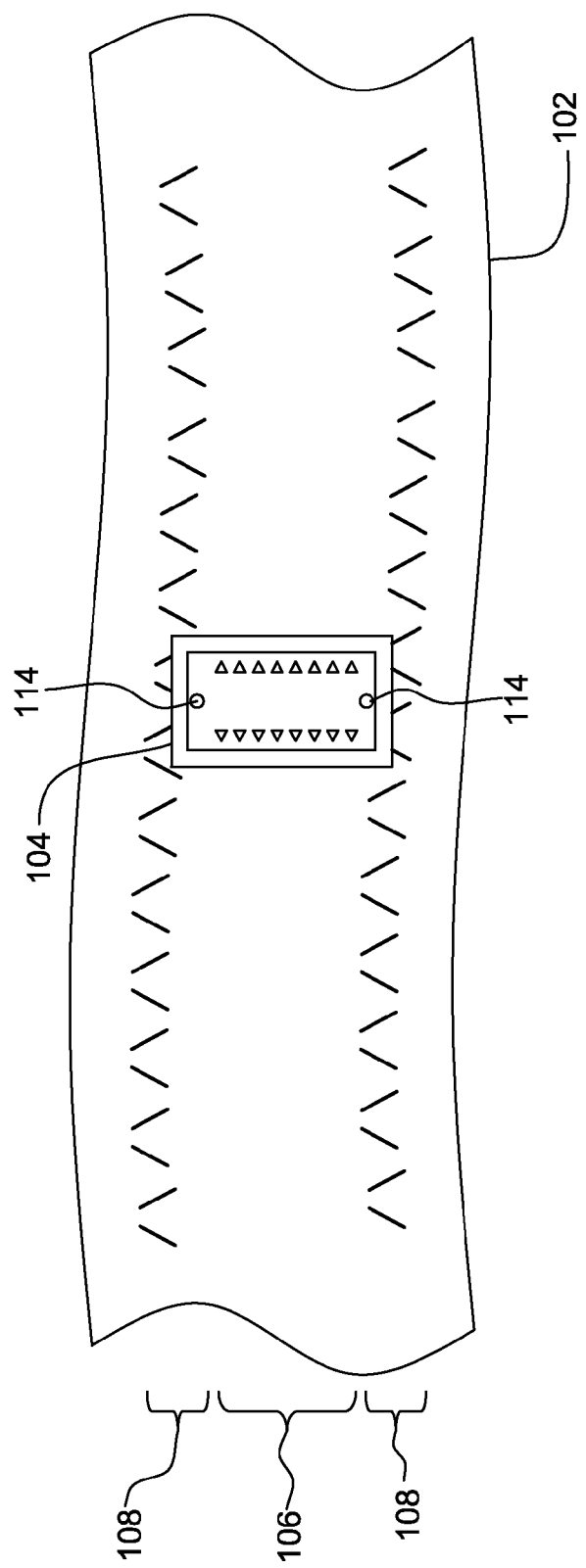
FIG. 2 illustrates a particular data band from tape moving across a tape head, in accordance with an embodiment of the present invention.

FIG. 2 illustrates a particular data band from tape 102 moving across tape head 104, in accordance with an embodiment of the present invention. Servo read elements 114 are aligned to respective servo bands 108. As data tape 102 moves longitudinally across tape head 104, the tape can "float" or wander laterally. To prevent this lateral movement, in some embodiments, flanges may be added to tape guide rollers, thereby maintaining alignment between tape 102 and tape head 104 and reducing skew. However, flanges may cause damage to edges of tape 102 and thus may not be employed to improve life of tape 102 and prevent debris. As a trade-off, flangeless tape guides allow for increased tape skew. Embodiments of the present invention recognize that without compensation for skew, deviation from the orthogonal angle between tape head 104 and tape 102, the trailing read/verify element cannot verify data written by the write element. Where a tape head is only capable of cross-track motion as a whole unit, and cannot tilt to compensate for the angle, sections of track with unverified data cannot be used. Due to the relative microscopic width of a data track, very slight angles can cause problems. FIG. 2 illustrates a slight curvature as tape 102 crosses tape head 104 due to such floating. Subsequent illustrations may exaggerate skew angles for visibility and discussion purposes.

The skew, as well as tape head position and tape velocity, can be calculated by an examination of servo patterns in servo bands 108—generally by examining the lateral time delay between detected servo patterns above and below the applicable data band 106.

Figure 3:
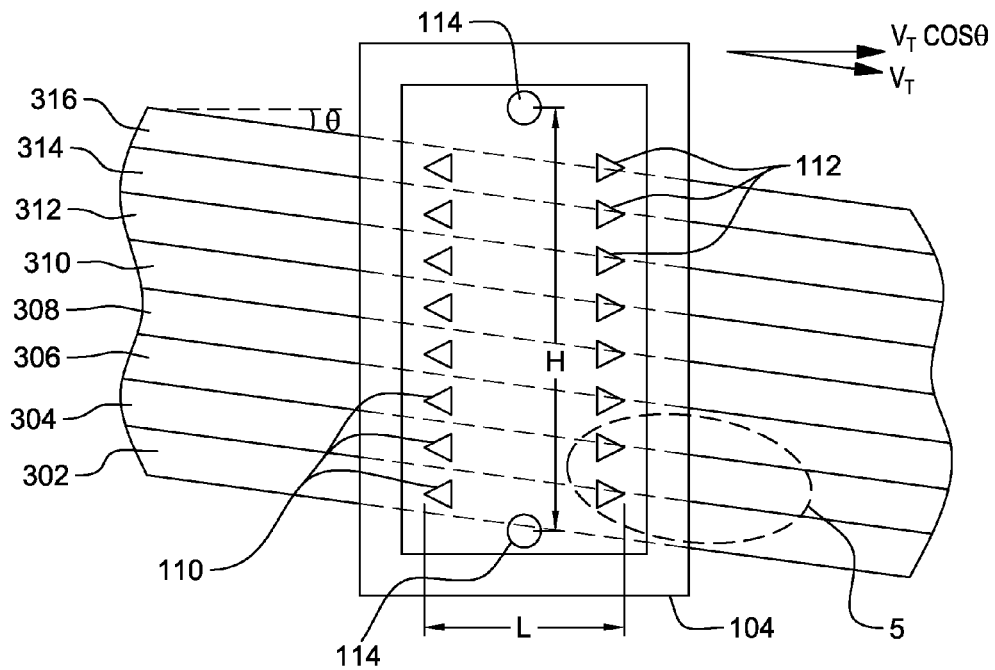
FIG. 3 depicts a view of data tracks of a data band crossing a tape head.

FIG. 3 depicts a view of data tracks, from one of the data bands 106, crossing tape head 104. In the depicted example, eight data tracks exist, data tracks 302, 304, 306, 308, 310, 312, 314, and 316 respectively. The data band, and respective data tracks, intersects tape head 104 at skew angle θ. Because of the skew angle, each read/verify element cannot properly verify data on the data track written by its corresponding write element. Take for example data track 302. The lowermost write element can write into a data block on data track 302. However, the lowermost read/verify element corresponding to the write element is actually positioned to read from data track 304 due to the skew. The distance between the write elements 110 and the read/verify elements 112 is shown as distance 'L'. The distance between servo read elements 114 is shown as distance 'H'. Tape 102 moves at a velocity of Vt. Controller 116 calculates values and uses these to determine the direction and distance that tape head 104 must move for read/verify elements 112 to be in the correct position to verify data written by write elements 110.

Servo read elements 114 read respective servo patterns on the respective top and bottom servo bands. As each pattern is read in the respective top and bottom servo bands, the start and finish time for reading each pattern is recorded. If the servo read elements 114 do not read corresponding top and bottom servo patterns at the same start and finish time, then the tape medium is skewed with respect to the servo read elements. In an exemplary embodiment, controller 116 calculates a skew timing based on the start and finish of the servo read elements reading the top and bottom servo patterns. Skew timing is the delay between reading a servo pattern on the top or bottom and the reading the skew pattern on the opposite (the time the bottom pattern was read—the time the top pattern was read). Because each pattern is actually read over a duration of time, for accuracy, we can consider the read of the respective pattern to take place at the center of the duration of time. As such, the skew timing can be calculated as:

Skew timing=(finish time of bottom servo read element+start time of bottom servo element)/2−(finish time of top servo element+start time of top servo element)/2

In one embodiment, controller 116 can calculate the skew angle of tape 102 with respect to the lateral axis of the servo read elements by the skew timing equation using the velocity of the tape to convert the skew timing into a distance, and then dividing the result by the spaced-apart distance between the servo read elements 'H.'

Skew angle=(finish time of bottom+start time of bottom−finish time of top−start time of top)*$Vt$/(2*$H$)

The skew angle may then be used to determine the distance that tape head 104 must move such that a read/verify element will read on the correct track. Again, the separation between the write and read/verify elements is given by the distance 'L.'

Distance to move=$L$*(finish time of bottom−finish time of top+start time of bottom−start time of top)*$Vt$/(2*$H$)

A negative result indicates that tape head 104 needs to be raised by the determined distance, a positive result indicates that tape head 104 needs to be lowered. A person of ordinary skill in the art will understand that variations on the above calculations exist that can be used to determine the skew angle and the distance to move.

Figure 4:
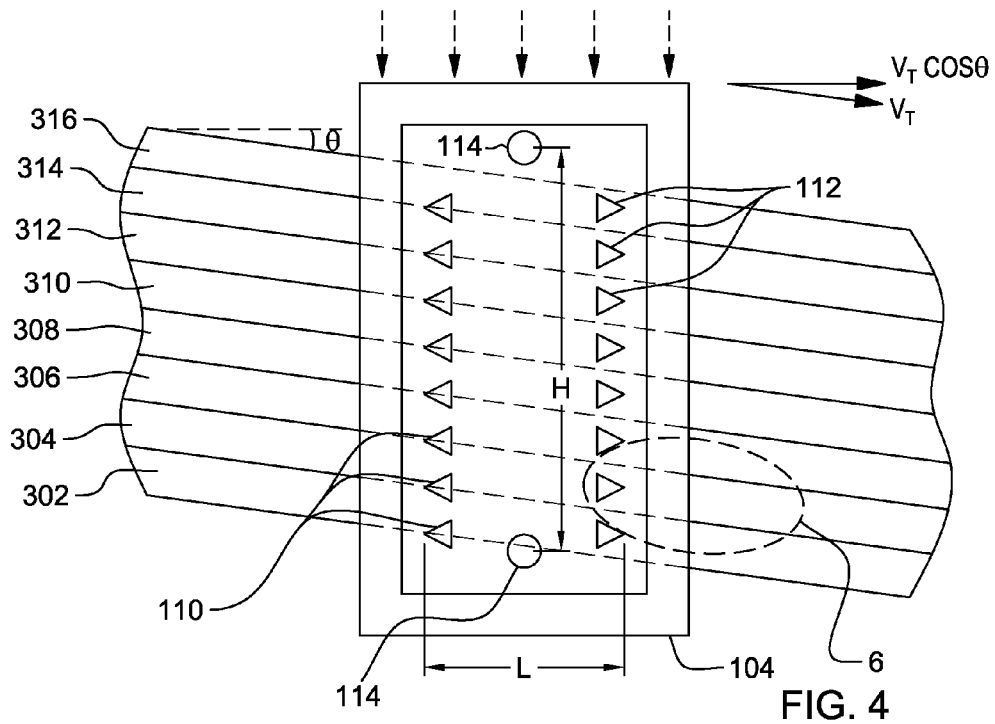
FIG. 4 illustrates a tape head moving cross-track by a determined distance so that read/verify elements will intersect data tracks written by write elements during a skew event.

FIG. 4 illustrates tape head 104 moving by the determined distance so that read/verify elements 112 will intersect the data tracks written by write elements 110. The skew angle, together with the distance between a write element and corresponding read/verify element, can be used to determine the distance, in the skewed direction, between the axis of write elements 110 and read/verify elements 112. The velocity can then be used to determine the time it takes for data written by a write element to intersect the line of read/verify elements 112. Controller 116 times the move of tape head 104 so that tape head 104 can continue to write data until data written at the start of the skew event needs to be verified.

As can be seen, moving tape head 104 to verify data during a skew event places write elements 110 on incorrect data tracks. Just prior to, or simultaneous with, the move, tape head 104 pauses the writing of data to avoid writing data on incorrect tracks. Subsequent to verification of data, servo bands 108 can be used to move tape head 104 back to the proper data tracks for writing. This process may perform iteratively until the skew event has passed.

Figure 5:
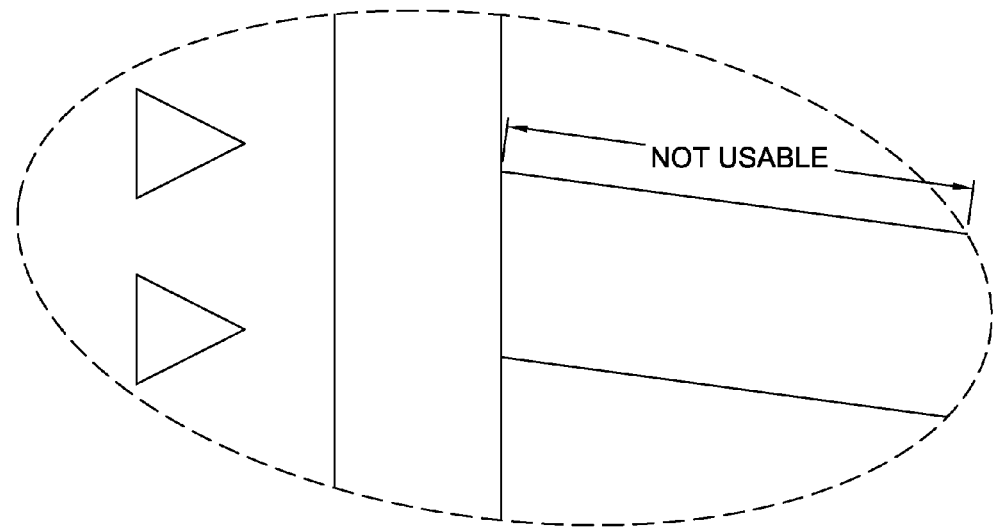
FIG. 5 depicts a data track where a tape head has been continuously adjusted for writing.

FIG. 5 depicts a data track where tape head 104 has been continuously adjusted for writing. Though data may be consistently written, because the data cannot be verified, the entire section of the data track during a skew event cannot be used.

Figure 6:
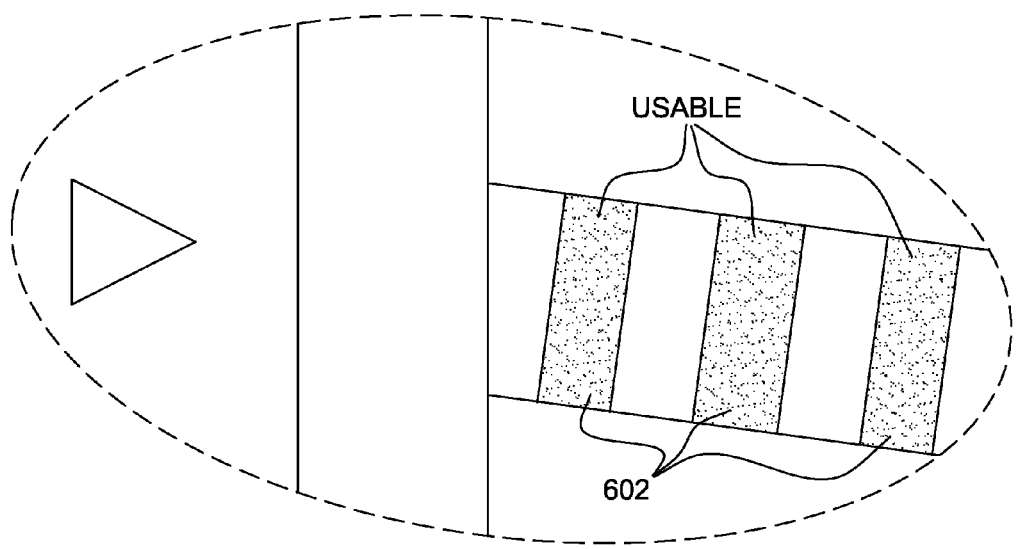
FIG. 6 depicts a data track where the tape head iteratively writes, pauses writing and moves for verification, and returns to the proper track for writing.

FIG. 6 depicts the same data track where the tape head 104 iteratively writes, pauses writing and moves for verification, and returns to the proper track for writing. Though portions of the data track may remain unwritten, multiple sections 602 of the track are properly written and verified, allowing for a successful partial write of data during a skew event. This process can be applied to existing track storage devices without the addition of hardware (e.g., additional actuators), thus resulting in cost savings in hardware.

Figure 7:
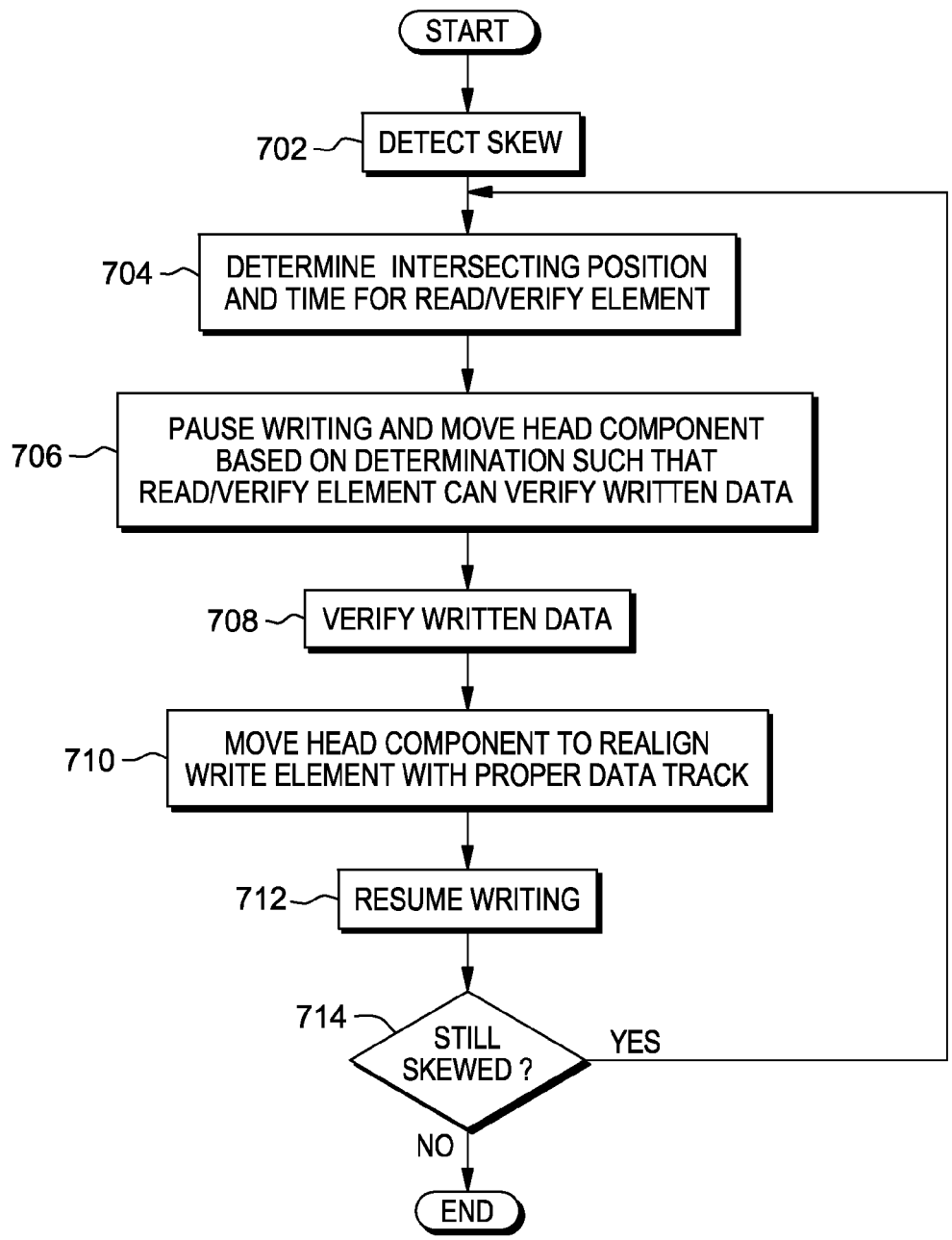
FIG. 7 illustrates the operational steps of the process for performing a partial write during a skew event.

FIG. 7 illustrates the operational steps of the process for performing a partial write during a skew event. In step 702, a controller (e.g., controller 116) detects a skew in the tape. The controller may receive readings from servo read elements in line with servo bands on either side of one or more data tracks. Subsequent to detecting a skew event, the controller determines an intersecting position and time for a read/verify element to verify written data (step 704). This can be accomplished based on the readings from the servo read elements. More particularly, the controller can calculate the velocity of the tape and the angle of the skew, and from these determine the distance to move and the time that the written data will intersect the read/verify elements. Based on the speed of moving the head, the time at which the tape head should be moved can be determined.

At the determined time, the controller sends a signal to pause the writing process and moves the head the determined distance such that a read/verify element can properly verify data written by a write element during the skew event (step 706). The read/verify element verifies the data (step 708). The controller moves the head to realign the write element with the data track (step 710) and resumes writing (step 712). The controller determines if the tape is still skewed (decision 714), and if so, continues the process from step 704. This process may iterate until the skew event has ended.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for writing data to tape during a skew event, the method comprising:
    moving storage tape longitudinally across a tape head, the storage tape having at least one longitudinal data track and the tape head having a write element for writing data to the data track and a read element for reading data from the data track;
    moving the tape head along an axis line lateral to the storage tape such that the write element intersects the data track;
    writing data to a section of the data track;
    determining that the storage tape is skewed such that the storage tape does not pass the axis line orthogonally;
    in response to determining that the storage tape is skewed, determining a position along the axis line to move the tape head such that the read element will intersect the data track and determining a time to start to move the tape head to the position such that the read element will intersect the section of the data track as the storage tape moves longitudinally across the tape head;
    at the determined time, pausing writing of data and moving the tape head to the position along the axis line; and
    reading the section of the data track to verify the written data.

2. The method of claim 1, further comprising:
    subsequent to reading the section of the data track to verify the written data, moving the tape head along the axis line such that the write element intersects the data track.

3. The method of claim 2, further comprising:
    iteratively writing data to the data track, pausing writing, moving the tape head to a determined position at a determined time to verify the written data, and moving the tape head so that the write element intersects the data track until there is no skew detected.

4. The method of claim 1, wherein the tape is one of: magnetic tape or optical tape.

5. The method of claim 1, wherein said determining the position along the axis line to move the tape head to comprises:
    determining an angle of skew and a velocity of the storage tape; and
    based on the angle of skew, the velocity of the storage tape, and a distance between the write element and the read element, determining a distance the read element must move along the axis line to intersect a path of the data track.

6. The method of claim 5, wherein said determining the time to start to move the tape head comprises:
    based on the angle of the skew and the velocity of the storage tape, determining a time span for the section of the data track to move from the write element to where the section could intersect with the read element; and
    based on a velocity of the tape head when moving along the axis line, determining the time to start to move the tape head.

7. A system for writing data to tape during a skew event, the system comprising:
    tape for storing data, the tape having at least one longitudinal data track;
    a tape head operative to move along a single axis line lateral to the data track, the tape head having a write element for writing data to the data track and a read element for reading data from the data track;
    at least one controller, communicatively coupled to the tape head, which, as the storage tape moves longitudinally across the tape head, operates to:
    move the tape head along the axis line such that the write element intersects the data track;
    write data to a section of the data track;
    determine that the storage tape is skewed such that the storage tape does not pass the axis line orthogonally;
    in response to determining that the storage tape is skewed, determine a position along the axis line to move the tape head such that the read element will intersect the data track and determine a time to start to move the tape head to the position such that the read element will intersect the section of the data track as the tape moves longitudinally across the tape head;
    at the determined time, pause writing of data and move the tape head to the position along the axis line; and
    read the section of the data track to verify the written data.

8. The system of claim 7, wherein the at least one controller further operates to:
    subsequent to reading the section of the data track to verify the written data, move the tape head along the axis line such that the write element intersects the data track.

9. The system of claim 8, wherein the at least one controller further operates to:
    iteratively write data to the data track, pause writing, move the tape head to a determined position at a determined time to verify the written data, and move the tape head so that the write element intersects the data track until there is no skew detected.

10. The system of claim 7, wherein the tape is one of: magnetic tape or optical tape.

11. The system of claim 7, wherein the at least one controller operating to determine the position along the axis line to move the tape head to comprises:
    determining an angle of skew and a velocity of the storage tape; and
    based on the angle of skew, the velocity of the storage tape, and a distance between the write element and the read element, determining a distance the read element must move along the axis line to intersect a path of the data track.

12. The system of claim 11, wherein the at least one controller operating to determine the time to start to move the tape head comprises:
    based on the angle of the skew and the velocity of the storage tape, determining a time span for the section of the data track to move from the write element to where the section could intersect with the read element; and
    based on a velocity of the tape head when moving along the axis line, determining the time to start to move the tape head.

* * * * *